R. S. CARR.
Assignor of one-half to J. E. NEAL.
MAGNETIZED HEAD FOR DRAWING INSTRUMENTS.
No. 11,189. Reissued Sept. 15, 1891.
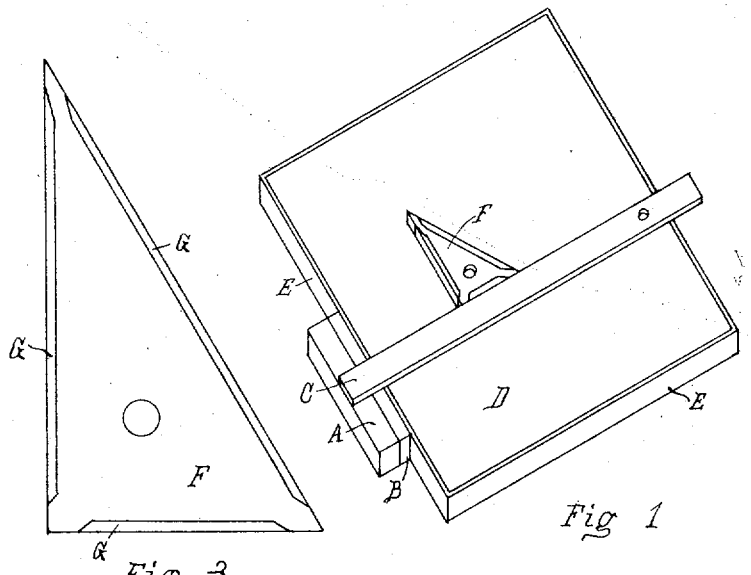
Fig 3
Fig 1
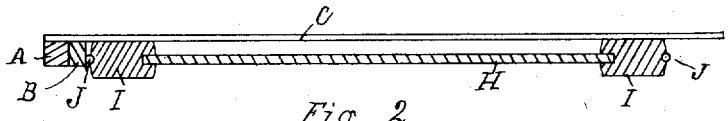
Fig 2
Witnesses
J. W. Sloneker
M. P. Manning
Robert S Carr Inventor
By W. S. Boyd, Attorney
THE NORRIS PETERS CO., PHOTO-LITHO., WASHINGTON, D. C.

UNITED STATES PATENT OFFICE.

ROBERT S. CARR, OF HAMILTON, OHIO, ASSIGNOR OF ONE-HALF TO JAMES E. NEAL, OF SAME PLACE.

MAGNETIZED HEAD FOR DRAWING-INSTRUMENTS.

SPECIFICATION forming part of Reissued Letters Patent No. 11,189, dated September 15, 1891.

Original No. 456,553, dated July 28, 1891. Application for reissue filed August 19, 1891. Serial No. 403,136.

*To all whom it may concern:*

Be it known that I, ROBERT S. CARR, a citizen of the United States, residing in Hamilton, in the county of Butler and State of Ohio, have invented certain new and useful Improvements in Magnetized Heads for Drawing-Instruments; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to improvements in drawing-tools adapted to the use of school children, draftsmen, and others; and it consists of slates and other plane surfaces bound on their edges with iron and drawing or T squares and triangles provided with magnets to adhere to the iron edges of said drawing-surfaces or to each other.

The objects of my improvements are to cause drawing-squares to adhere to the edges of drawing-surfaces; to permit easy longitudinal adjustment of said squares along said edges; to prevent the blade of said squares deviating from the desired line on said surfaces; to cause triangles to adhere to the blades of drawing-squares or to the edges of drawing-surfaces; to add to the strength of the drawing-surfaces by binding the edges thereof with iron or wire, and to permit the use of drawing-surfaces at a greater vertical angle. I attain these objects in the following-described manner, reference being had to the accompanying drawings, in which—

Figure 1 is a perspective view of a drawing-board square and triangle; Fig. 2, a vertical section of a slate and a drawing-square; Fig. 3, the plan of a drawing-triangle.

A represents the head of a drawing-square; B, a bar-magnet attached to the inside edge of said head; C, the blade of said square.

D represents a drawing-board or other plane surface; E, a band of iron attached to and forming the edges thereof; F, a drawing-triangle; G, bar-magnets attached to and forming the edges of said triangle. H shows a slate; I, its frame; J, an iron band or wire encircling said frame.

In construction the magnet B may be slightly concave on the side adjoining the drawing-board to insure contact at or near its extremities with edges or armatures E of the drawing-surface. Any form of magnet or magnets may compose head A, or be attached thereto in such manner as to cause adhesion to the armature or edge E.

Blade C may consist of iron or other material attached rigidly to or swiveled on head A.

D is a plane surface of wood, slate, or other material, provided with iron edges E, extending either partially or wholly around said surface. Magnet B adheres to edges E to hold the square in place and keep the blade C in the desired line. The square may be moved along the edge or armature E with very little effort, but will resist being detached therefrom.

F is an ordinary triangle, of wood or other non-conducting material, having bar-magnets G attached to and forming its edges, except near the corners thereof, where the body of the triangle extends between the ends of the magnets G to form the corners of said triangle and keep the magnets from contact. When the blade C is of iron, the triangle will adhere thereto in the same manner and for the same purpose that the drawing-square adheres to edges E.

Fig. 2 shows the foregoing principles applied to a school-slate, (represented by H,) the slate-frame I being surrounded by iron wire J, which strengthens said frame and acts as an armature for magnet B. In this form a very useful and attractive article possessing educational advantages is provided for the use of school children. The slate-frame I may consist of iron to act as an armature instead of the band or wire J. The iron edges E of the drawing-surface may extend above the plane thereof, when the triangle could be operated along the inside of said edges without the use of the square. The adhesion of the square to the edges of drawing-surfaces in this manner is such that it will remain in place when said surfaces are inclined to almost a vertical angle.

Having thus described my invention, what I claim, and desire to secure by Letters Patent, is—

1. In combination, a drawing-surface with a metallic edge and a device adapted to adhere to the edges of said surface by magnetic attraction and having a portion thereof extend over the surface as a guide for drawing-instruments, substantially as described.

2. In combination, a drawing-surface with iron edges extending above the plane of said surface and a device adapted to adhere to said edges by magnetic attraction and having a portion thereof extend over the surface, substantially as described.

3. In combination, a slate surrounded by an iron band or armature and a T-square, the head of which is provided with a magnetic portion, which is adapted to engage with the armature, substantially as described.

4. A drawing-square with a magnetized head.

5. A drawing-square combining a blade of iron or other magnetic material, with a head provided with one or more magnets.

In testimony whereof I affix my signature in presence of two witnesses.

ROBERT S. CARR.

Witnesses:

J. W. SLONEKER,

MOLLIE P. MANNING.